United States Patent [19]
Ernst

[11] Patent Number: 4,682,791
[45] Date of Patent: Jul. 28, 1987

[54] DEFLECTION DEVICE FOR A SAFETY BELT ARRANGEMENT HAVING PROGRESSIVE BELT CLAMPING

[75] Inventor: Hans-H. Ernst, Sülfeld, Fed. Rep. of Germany

[73] Assignee: Britax-Kolb GmbH & Co., Dachau, Fed. Rep. of Germany

[21] Appl. No.: 793,698
[22] PCT Filed: Feb. 14, 1985
[86] PCT No.: PCT/EP85/00050
 § 371 Date: Oct. 24, 1985
 § 102(e) Date: Oct. 24, 1985
[87] PCT Pub. No.: WO85/03676
 PCT Pub. Date: Aug. 29, 1985

[30] Foreign Application Priority Data
Feb. 25, 1984 [DE] Fed. Rep. of Germany ....... 3406946
Apr. 3, 1984 [DE] Fed. Rep. of Germany ....... 3412383

[51] Int. Cl.$^4$ ............................................. B60R 22/36
[52] U.S. Cl. ..................................... 280/806; 280/808
[58] Field of Search ............... 280/801, 802, 806, 807, 280/808; 180/268

[56] References Cited

U.S. PATENT DOCUMENTS 4,185,791 1/1980 Takada ............................... 280/802
4,371,126 2/1983 Tsuge et al. ....................... 280/808
4,470,617 9/1984 Yamada et al. ..................... 280/806
4,547,018 10/1985 Cunningham ....................... 280/808

FOREIGN PATENT DOCUMENTS 0034702 9/1981 European Pat. Off. .
1481969 9/1969 Fed. Rep. of Germany .
2420848 11/1974 Fed. Rep. of Germany .
2540302 3/1977 Fed. Rep. of Germany .
2348654 9/1978 Fed. Rep. of Germany .

Primary Examiner—John J. Love
Assistant Examiner—Ross Weaver
Attorney, Agent, or Firm—Hoffmann, Dilworth, Barrese & Baron

[57] ABSTRACT

The invention relates to a deflection device with means for direct clamping locking of the belt which takes place according to the severity of the loading in a progressive manner. With the usually occurring locking in normal vehicle conditions, such as for example upon braking above 0.4 g, a first arresting action takes place with a weak clamping which does not damage the textile webbing. Only in the case of higher loading, which occurs in the case of an accident, a second arresting action occurs which effects secure and slip-free load transfer by application of aggressive clamping means. This type of locking is—excluding taut belts—the most efficient. It results in very small initial displacement of the occupant. The use-cost analysis is optimal since light and economic winders can be employed.

24 Claims, 20 Drawing Figures

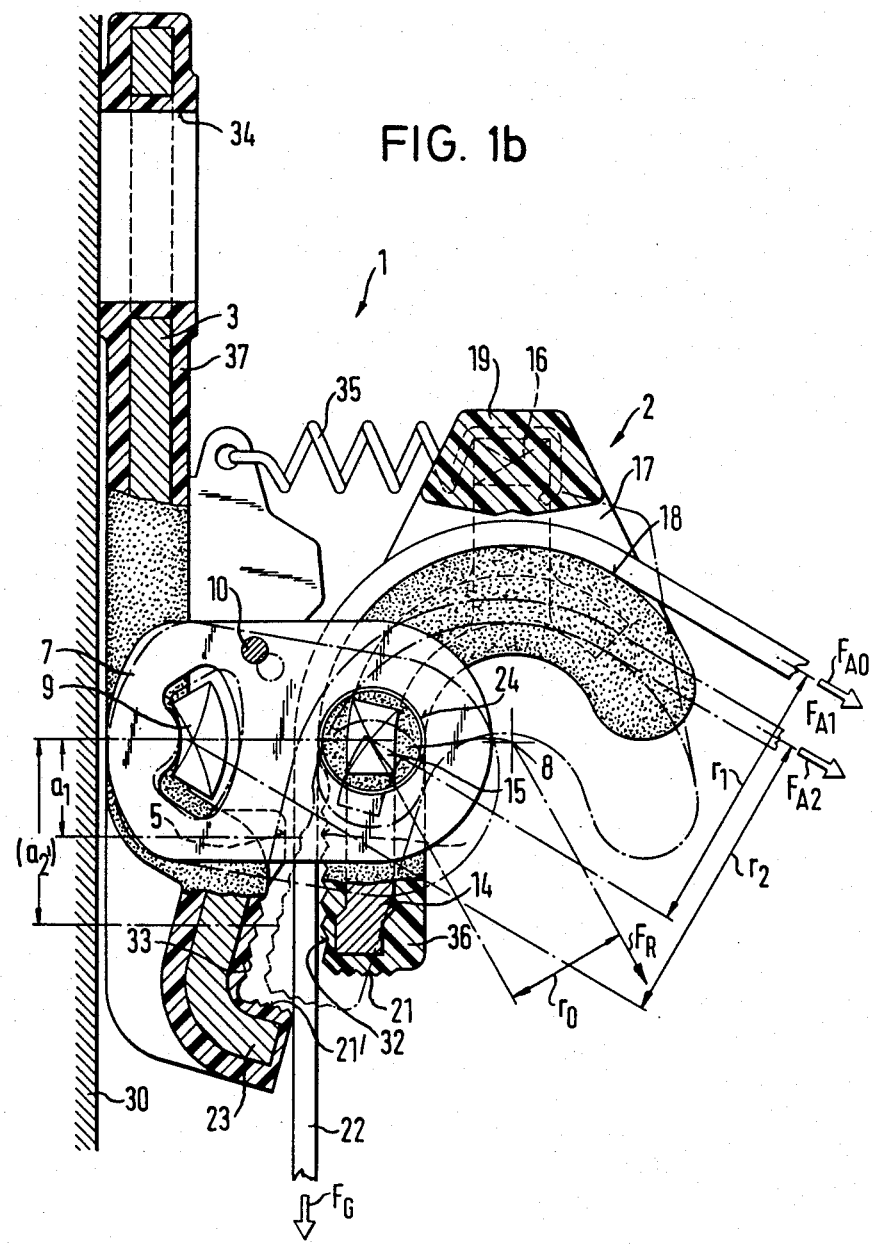

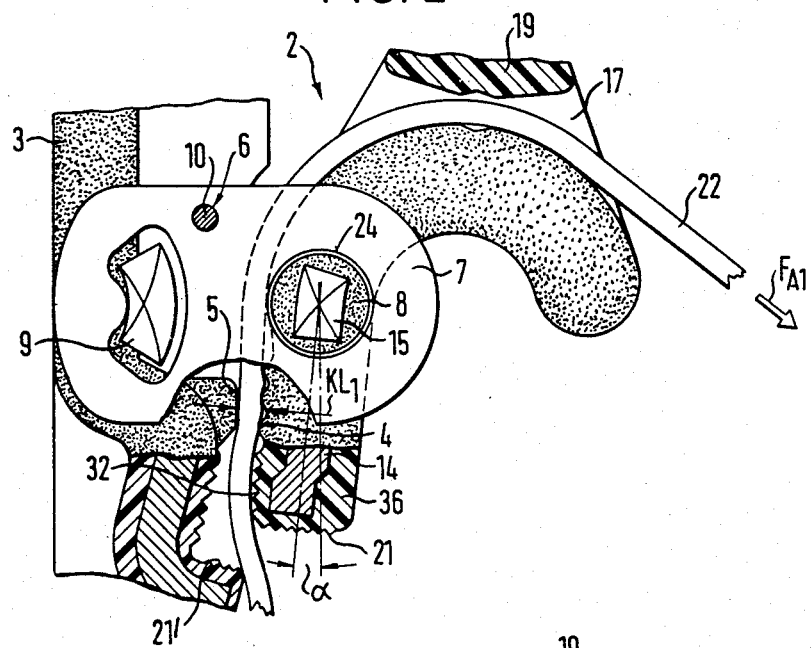
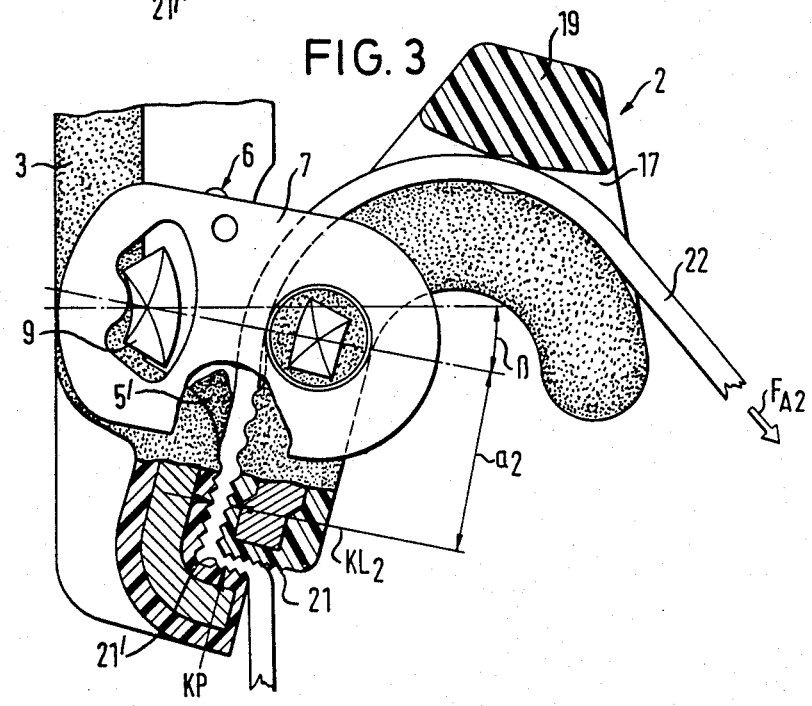

DEFLECTION DEVICE FOR A SAFETY BELT ARRANGEMENT HAVING PROGRESSIVE BELT CLAMPING

The invention relates to a deflection mounting which is preferably attached on the B-column of a vehicle for the front occupants and is designed for direct locking of the belt and absorption of load caused by an accident.

With today's safety belts, on the occurrence of an accident the reel winder is locked and tranfers the load from the occupants via the deflection mounting to the chassis. As a result of the film spool effect on the winding reel of the winder (extension of the belt permitted by slackness between successive turns without rotation of the reel) and stretching of the belt between the winder and the deflection mounting, the occupant experiences an additional initial displacement which—in particular in the case of small vehicles—can be unpleasantly noticeable. Head impact on the steering wheel and dashboard is possible.

In order to prevent this additional initial displacement, it is useful to effect arresting of the belt directly in the deflection mounting, thus as close as possible to the occupant. For this purpose, many solutions have already been suggested which all make use of the locking principle according to DE-PS No. 1 481 969. The belt-withdrawal force acts upon a rotatably mounted locking body with a lever arm ($L_1$) and acts through a smaller lever arm ($L_2$) as a belt clamping force. From this basic principle, various differing developments have resulted over the years.

The decisive evaluation criteria for the efficiency of the individual proposals are the clamping effect in dependence upon the belt withdrawal direction and the aggressiveness of the clamping surfaces with repeated locking of the belt.

Thus, DE-OS No. 2 420 848 illustrates a clamping device which operates substantially independently of various belt withdrawal angles. The clamping effect is at its most favourable (largest lever arm) if the belt proceeds horizontally as shown in EP No. 0 034 702. However, this produces high friction with a coefficient of greater than 1 being necessary in order to achieve slip-free clamping of the belt. This requires aggressive (sharp-edged) clamping surfaces which has a disadvantageous effect on the durability of the textile belt subjected to repeated locking operations.

It is conceivable to utilize such a clamping device in connection with a deliberate weak point to be activated only in an accident, perhaps with an average loading of about 4 kN belt withdrawal force. This however entails an extremely stable winder reel. One of the most important advantages of a deflector clamping device absorbing the entire load is however that it enables the installation of lighter and cheaper winder reels because it is no longer necessary to transfer the load to the winder. Also the film spool effect would occur to some extent.

Another variant is shown by DE-OS No. 2 348 654 and a prototype thereof in FIGS. 7 and 8 of DE-OS No. 2 540 302. Whilst this embodiment avoids aggressive clamping surfaces, it is however ineffective with a horizontal direction of belt withdrawal. The clamping effect is insufficient; it is associated with slip. In today's vehicles with large occupants (corresponding to a 95% dummy), horizontal belt withdrawal onto the shoulder of the occupant is possible. Moreover, in this version, which is always coupled with an electromagnet for release, there exists a relatively large path loss in the belt as a result of the large pivot angle which makes itself apparent as unfavourable initial displacement of the occupant.

The invention is based on the object of providing a deflection mounting with means for direct arresting of the belt in which the clamping process takes place immediately in the shortest path without damage to the belt and without slip and the belt withdrawal direction remains without disadvantageous influence.

This problem is solved according to the invention in that a two-stage arresting device is provided in such manner that with usual locking not under accident conditions, upon exceeding of a predetermined deceleration (0.4 g) a first locking action in the form of gentle belt clamping takes place by means of lever-like tipping of a spring-loaded deflection element which in the case of an accident and a higher deceleration (about 10 g) transfers to a second locking effect with a more fully effective belt clamping for secure and slip-free load absorption.

A first clamping device for continuous locking without damaging the belt approximately according to DE-PS No. 1 481 969 takes place however with improved lever ratios which require a coefficient of friction $\mu$ of approximately 0.5. Transition into a load-bearing clamped locking position by pivoting of the deflector into a position in which the belt is securely clamped takes place only during an accident by breaking of a deliberate weak point at a predetermined loading (approximately 4 kN belt tension). In this position, the belt section which extends downwardly to the winder is completely unloaded. Only the loading of the occupant, which is approximately 8 kN, acts on the deflection device. In comparison with the usual deflectors thus only a part of the loading occurs so that a correspondingly lighter construction both of the mounting and also of the securing position on the chassis can be provided.

Continual locking with small loading during braking and negotiation of curves (about 0.4 g) occurs immediately without noticeable belt withdrawal as a result of a slight tilting movement of the deflector against clamping ribs (5) of the base plate. This arresting action takes place without damaging the belt between synthetic material without injury of the textile webbing. Also, the belt is not creased during locking as for example in DS-OS No. 2 348 654 so that also no disadvantageous effects on the wind-up characteristic occur. Only in the case of an accident, there occurs a belt-deforming clamping for securing slip-free secure load-absorbing locking.

The path loss (belt withdrawal) for initiating locking up to a belt withdrawal force of 10 kN amounts only to .5 mm in the deflection device according to the invention. With today's deflectors without a clamping device in the case of an accident with occurrence of the film spool effect about 120 mm of belt withdraws which can be decisive regarding whether or not head impact takes place.

According to an advantageous further development, for the first arresting action the deflection element is provided with a lever ratio larger than 2 which is so tiltable that two elastically/plastically deformable pre-clamping surfaces come into engagement. Upon the occurrence of an accident-determined larger deceleration following plastic deformation of at least one of the deformable preclamping surfaces with corresponding further positional change of the deflection element for the second arresting action with more effective belt clamping, two aggressive clamping surfaces come into engagement.

According to a special embodiment of the invention, the deflection element is pretensioned with two mounting pins and is rotatably mounted in two pivot arms connected to a base plate via a deliberate weak point.

The base body of the deflection element can in this connection also be constructed from a punched and folded part as a semicircular profile from which two mounting arms extend in the axial direction as well as two upwardly bent limit pins.

In order to effect a particularly effective clamping of the belt during deceleration caused by an accident, the aggressive clamping surfaces are constructed from a flange (L-shaped construction) and a clamping part shaped to fit this. In this regard, this flange is secured to the base plate and the clamping part is itself formed from the deflection element and is movable with this in such manner that it can come into engagement with the L-shaped flange.

Expediently, the pivot arms have on the one hand a round mounting bore for receiving the mounting pins and on the other hand have an opening with a pivoting curved member which engages in a profiled shaped holder of the base plate.

The pivot arms are arranged to be substantially horizontal in their initial position and the deflection device is inclined in the driving direction onto the shoulder of the occupant and rigidly connected to the chassis.

For activation, between the deflection element and the base plate a solenoid can be arranged which responds to electrical signals of an electronic vehicle sensor and/or brake light switch to execute a lifting movement for initiating clamping. Regarding an expedient constructive embodiment, the base body as a punched and folded part can have two limit surfaces with holes for a roller axle and a concave support surface, two support ribs, pressed clamping surfaces and a lower clamping surface, a pivot axis being rigidly arranged between two openings. In this way, the base body is provided with a friction arm rotating deflector roller. This base body clamps in a first arresting step with round metallic clamping surfaces against a hard rubber post. In a second arresting step, clamping takes place with a lower clamping surface against a clamping surface of a flange of the base plate.

It is also possible however to rotatably fasten a clamping wedge in a spring-biased manner onto the base plate so that an automatic shape adaption of the clamping surfaces takes place. For improving the mutual adaption of the clamping surfaces, moreover the deflection element can be mounted with its axis of rotation in an elastic bearing.

The two-stage clamping effect can be brought about by integrating the clamping surfaces as truncated clamping surfaces in that a flexible adhesive layer is applied on one aggressive toothed clamping surface.

For constructive simplification and centralization of the most important parts, a winder for the belt can be intergrated in the housing of the deflection device.

Moreover, it is preferred to mount the vehicle-sensitive sensor itself in an integrated manner in the deflection device. By this means, a movable sensor part can be so arranged in the deflection element mounted on the vehicle that this sensor part acts on an activation member and thereby the activation member is engageable with a gripping surface on the belt.

The activation member itself can be rotatably secured as a pivoting lever on the deflection element so that the deflection element is movable by means of the activation member with the clamping surface on the belt when the activation member itself comes into engagement with the belt.

The sensor member can advantageously be a movably mounted ball.

Exemplary embodiments of the invention are illustrated in the drawings, in which:

FIG. 1b shows the deflection device in the rest and locking position;

FIG. 2 shows the pivot device in the first arresting position;

FIG. 3 shows the deflection device in the second arresting position;

Figure 1A:
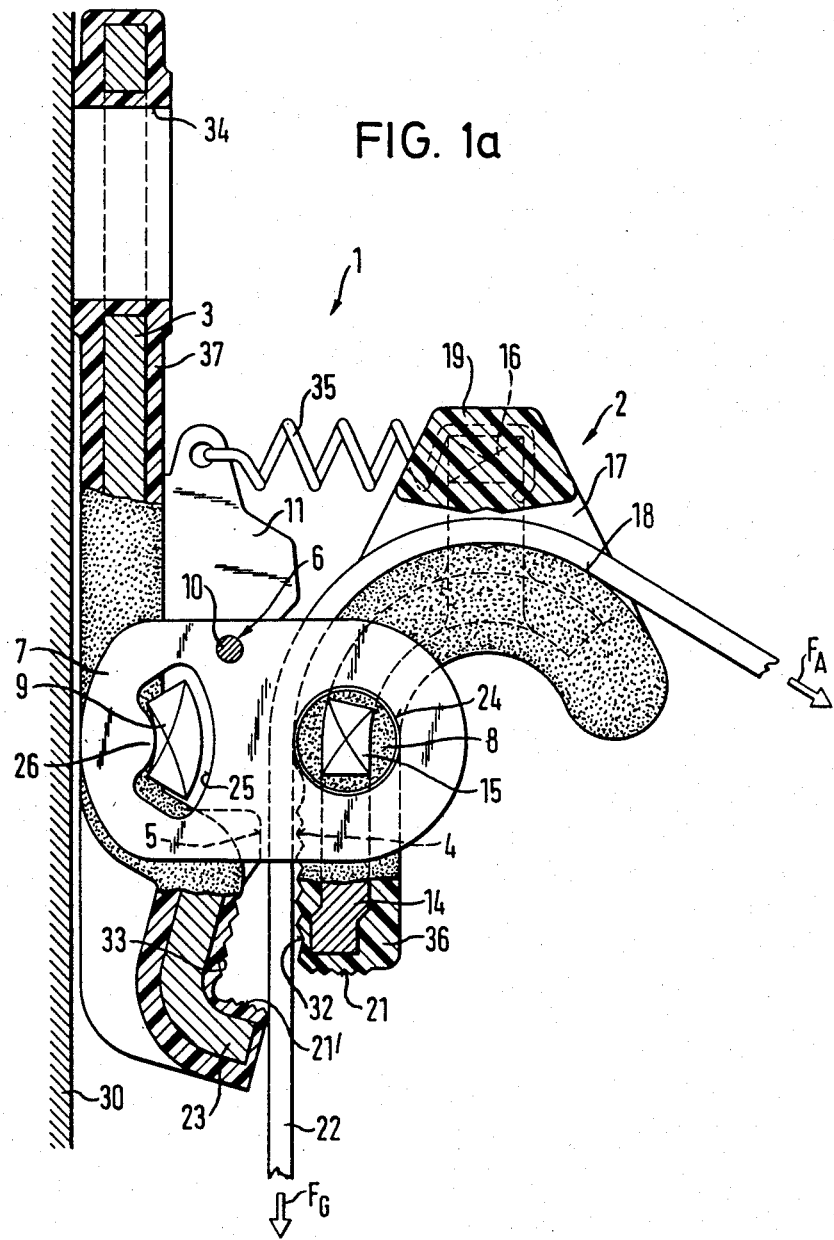
FIG. 1a shows the deflection device in the rest position.

FIG. 1a shows a deflection device 1 for variable belt clamping in the rest condition. In FIG. 1b, the end position with high loading in an accident is indicated with dashed lines. Similarly, the force and lever relationships are represented. The variable belt clamping appears from FIG. 2 with the usually occurring first arresting action and from FIG. 3 with the second arresting action in the case of an accident.

A base plate 3 is connected in the usual manner via a screw through a securing hole 34 to the chassis 30. A pivot arm 7 is rigidly connected to the base plate 3 via a mounting 9 and a breakable pin 10. In a mounting bore 24 of the pivot arm 7, the deflector 2 is rotatably mounted. A tension spring 35 holds the deflector 2 against a stop in the illustrated rest position. If the occupant moves forwards, the belt 22 is withdrawn with the force $F_A$ against the force $F_G$ of the drive spring in the winder. If the occupant moves backwards, the winder takes up the belt 22 with the force $F_G$. The overall formation of the described parts operates as a conventional deflection mounting which according to the size and sitting position of the occupant directs the belt withdrawal $F_A$ onto the shoulder. The strength of the tension spring 35 is so chosen that the rest position according to FIG. 1a is retained up to about 30 N ($F_{A0}=0$ to 30 N).

In the case of a deceleration acting on the vehicle, during braking or driving around a corner, which is greater than 0.4 g and corresponding movement of the occupant with withdrawal of the belt, belt clamping according to FIG. 2 takes place (first arresting mode).

A sensor in the winder blocks the winder shaft and locks the belt withdrawal. If as a result of the forward movement of the occupant the belt withdrawal force $F_{A1}$ increases above 30 N, the deflector 2 tips with its mounting pin 8 in the mount hole 24 in a right-hand rotation and clamps the belt 22 between the two clamping surfaces 4 and 5.

Before the clamping takes place, the force resultant $F_R$ has the effect of initiating the tipping movement with the tipping angle $\alpha$. After the tipping operation, there exists a force ratio of $F_{A1} \times r_1 : KL_1 \times a_1$ which is about 2.5 in the drawing. As a result of this relationship, the necessary coefficient of friction $\mu$ of 0.4 occurs at the clamping position 4/5. Then with a loading of about 40 N clamping of the belt occurs. A clamping force $KL_1$ then amounts to $40 \times 2.5 = 100$ N. With a value of $\mu = 0.4$, 40 N can be resisted. As a result of the friction effect between the belt 22 and the deflector surface 18 anyway only about 35 N are exerted on the clamping position, which can be regarded as a safety factor.

Secure clamping of the sensitive textile webbing of a belt having a coefficient of friction $\mu = 0.4$ can be enabled without damage to the belt. The friction between the belt material (polyester/polyamide) and rubber is about 0.7. Thus, even flat clamping surfaces 4/5 can be employed which neither damage nor deform the belt 22.

Even the synthetic material moldings 36 and 37 of the base plate 3 and the deflector 2 can be made almost smooth on the clamping surfaces 4 and 5 for the first arresting mode since the coefficient of friction in respect of synthetic material also lies between 0.35 and 0.4. For safety purposes however a slight but not weak profiling is provided at least on one clamping surface such as is illustrated at 4.

With this form of belt locking in the deflection mounting a loading higher than 40 N never is exerted on the winder. It is apparent that this can now be manufactured to be lighter and cheaper and even smaller. Also the deflector clamping device 1 receives substantially less loading since only the force $F_{A2}$ is to be transferred in the case of an accident. With a conventional deflector, this force is transferred as $F_G$ to the winder so that a resulting force $F_R$ occurs which is about 50% larger than $F_A$.

FIG. 2 shows that for providing the first arresting action only a small tipping angle $\alpha$ is necessary. This means an immediate belt locking without noticeable belt withdrawal. No measurable film spool effect or measurable able belt extension between the winder and the deflector has been observed up to 40 N. Apart from the use of a taut belt, this form of belt locking is the most effective according to the current state of knowledge.

If deceleration of the vehicle is extremely high, so that an accident is occurring, the loading $F_A$ increases. If this exceeds a predetermined value, the pin 10 breaks at a deliberate weak point and the deflector 2, guided by the pivot arm 7, changes its position into that shown in FIG. 3.

After pivoting through the angle $\beta$ the following force conditions are present:

$$F_{A2} \times r_2 = KL_2 \times a_2.$$

In the drawing, this relationship is always 1.5 so that a coefficient of friction $\mu$ below 1 will be sufficient for secure clamping. Since however an accident (to be followed by belt exchange) change) is occurring, having regard to absolutely secure and slip-free locking, aggressive clamping means ($\mu$ greater than 1) can be employed. This is represented in the drawings by sharp clamping teeth on the clamping surfaces 32 and 33.

For additional safety, the belt is pressed between the surfaces 21 and 21'. In order to press the belt 22 in the manner of a stamp into the profile clamping surface 4, the preceding clamping surface 5', which preferably consists of a hard rubber composition, has to a large extent been pressed away by the pivoting process.

The final load-absorbing locking is thus formed from a combination of the clamping of the belt ($F_{A2} \times a_2$) and pressing of the downwardly directed component KP of the accident loading in a similar manner to a belt adjuster in the case of a static belt. The force KP is sustained by a flange 23 of the base plate 3.

Figure 4:
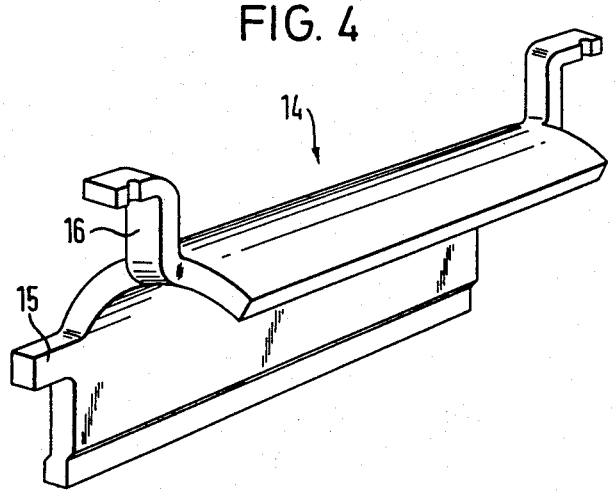
FIG. 4 shows the base body of the deflector.
Figure 5:
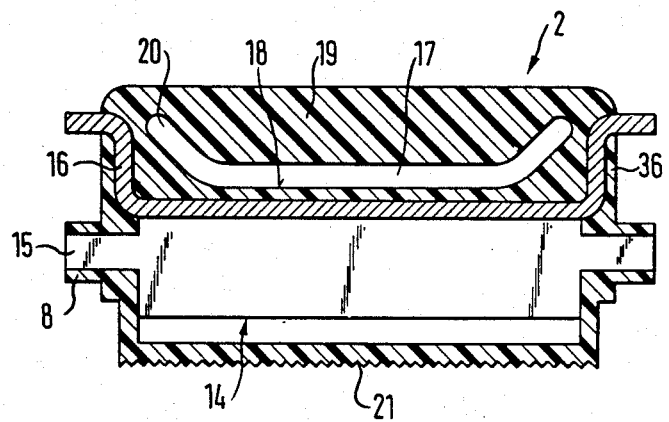
FIG. 5 shows the deflector in sections.

A construction of the deflector 2 according to the invention is visible from FIGS. 4 and 5. A load-absorbing base body 14 is constructed as a semi-rounded profile with a high moment of resistance. The synthetic material molding 36 gives the deflector 2 the correct functional form. The mounting arms 15 are molded as journal bearings 8. Between the limit lugs 16, the belt slot 17 extends with the raised belt outlets 20. The upper part 19 serves for fixing the belt in position. This embodiment functions correctly, is economic and is also easily constructed as a result of the advantageous design.

Figure 6:
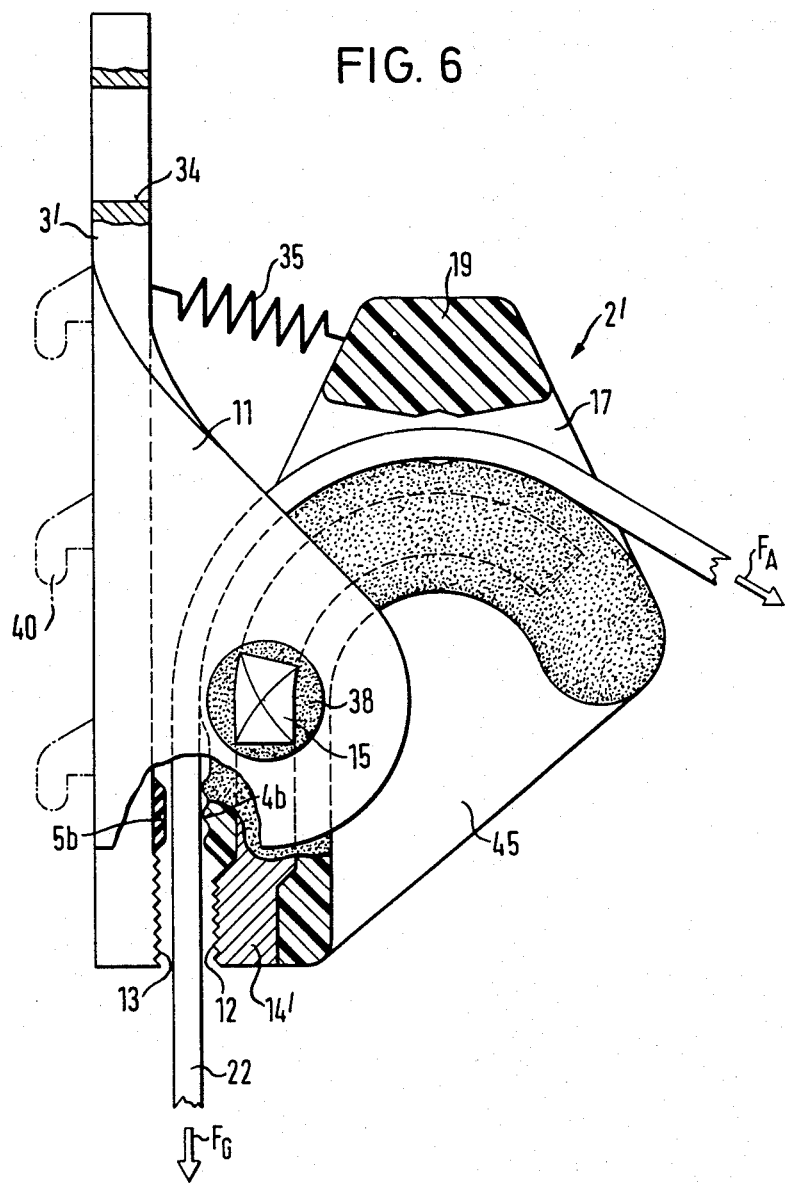
FIG. 6 shows an alternative assembly of the deflection device.

FIG. 6 shows a simplified embodiment of the idea according to the invention with a first mode of arresting without damage to the belt for the usually occurring locking with small forces $F_{A1}$ and a second aggressive arresting for accident conditions to absorb the maximum loading $F_{A2}$.

The simpler construction can be achieved in that the additional locking between the clamping surfaces 21 and 21' is omitted.

Similar to the first embodiment, the first arresting action takes place between weak clamping surfaces 4b and 5b, 5b being expediently a smooth hard rubber insert which presses the belt 22 in the form of a stamp into the weakly profiled clamping surface 4b.

When the load $F_A$ increases in the case of an accident, here no sudden transfer (deliberate weak point) into the second arresting position occurs but rather a gradual transfer. By means of plastic/elastic deformation of the clamping surfaces 4b and 5b, the sharp teeth 12 and 13, formed directly on the base body 14', and the base plate 3', come more and more into engagement until the entire clamping area is effective.

For a rigid connection of the base plate 3' to the chassis 30 according to claim 13, chain-dotted claws 40 are illustrated which engage in corresponding holding openings and transfer the load directly, without additional fastening elements.

Figure 7:
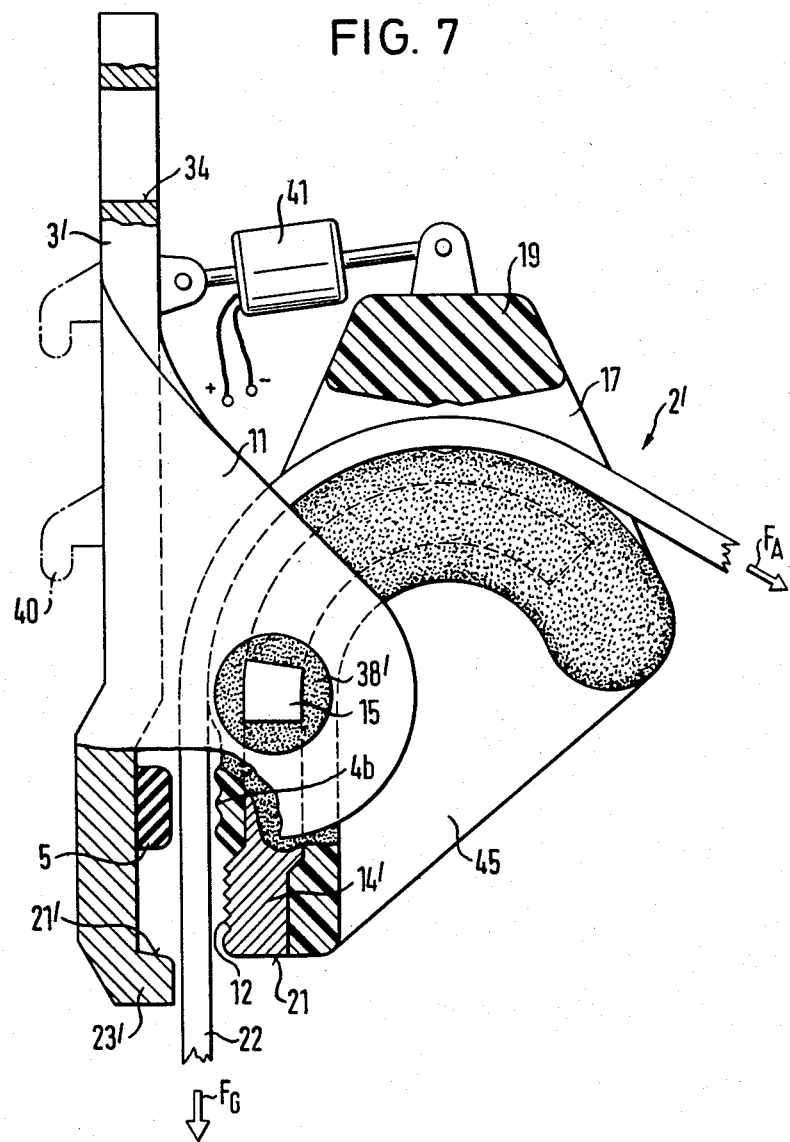
FIG. 7 shows a deflection device with electrical initiation of locking.

FIG. 7 shows the progressive clamping in a simplified embodiment similar to that illustrated in FIG. 1 with an additional flange 23' on the base plate 3'. The first arresting action takes place by means of slightly rounded clamping surfaces 4b against a hard rubber pin 5. When the loading increases, the deflector 2' pivots so that the belt comes between the clamping surfaces 21 and 21'. If the load increases further, the mounting box 38' deforms so that a similar clamping force KP as in FIG. 3 occurs which operates in a secure and slip-free manner.

Furthermore, in FIG. 7 a solenoid 41 is illustrated instead of the tension spring 35. In the rest position, it pulls the deflector 2' back. When electrically activated by means of a vehicle sensor and/or the brake light circuit, it pushes the deflector 2' into the clamping position so that the first arresting action is initiated.

Figure 8:
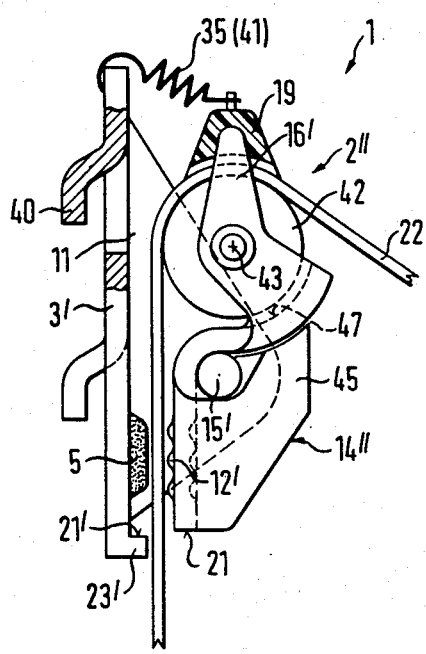
FIG. 8 shows a deflection device with a deflector roller.

FIG. 8 shows a deflector 2" having low friction belt guidance by means of a roller 42 which is mounted in the limit surfaces 16' of a base body 14". The synthetic material molding of the base body 14" is only partially illustrated with the upper member 19. Pivoting against the spring 35 (or by means of the solenoid 41) takes place around a pivot axle 15' which is rigidly connected to the base body 14". It is clamped in the openings 48 and thereafter molded together with the base body 14". Under load, the deflector roller 42 can bend into a concavely curved support surface 47. In order to achieve load transfer to the second arresting position with low distortion, two support ribs 45 are provided.

When the deflection device 1 is arranged in a protruding section of the B column according to DE-PS No. 31 04 598 aligned with the shoulder of the occupant, pivoting about a vertical axis, as suggested in DE-PS No. 24 20 848, can be omitted. The overall embodiment becomes lighter and cheaper if claws 40 are formed on the base plate 3 which engage in corresponding openings of the chassis metal (or on the contrary claws of the chassis engage in corresponding openings of the base plate).

In the deflection device according to FIG. 8, the first arresting action of the belt 22 takes place between a slightly rounded metal clamping surface 12' against a synthetic material pin 5, and the second arresting action corresponds to that shown in FIG. 7.

Figure 9:
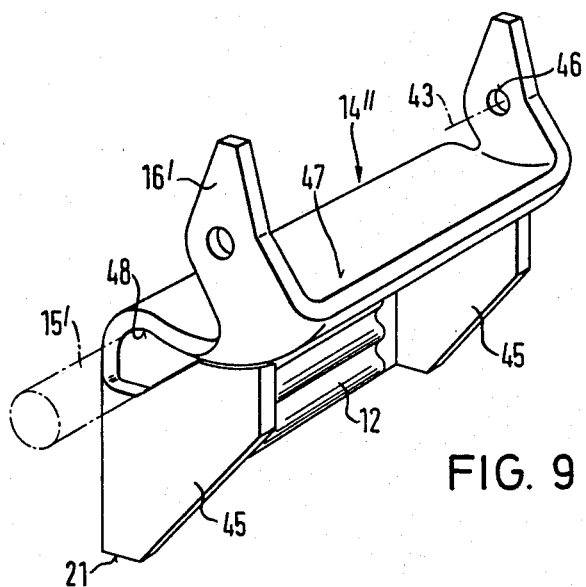
FIG. 9 shows the base body of a deflection device according to FIG. 8.

FIG. 9 finally shows the base body 14" of the deflector 2" as a curved, pressed component. The advantageous stiffness of the construction is clear.

Figure 10:
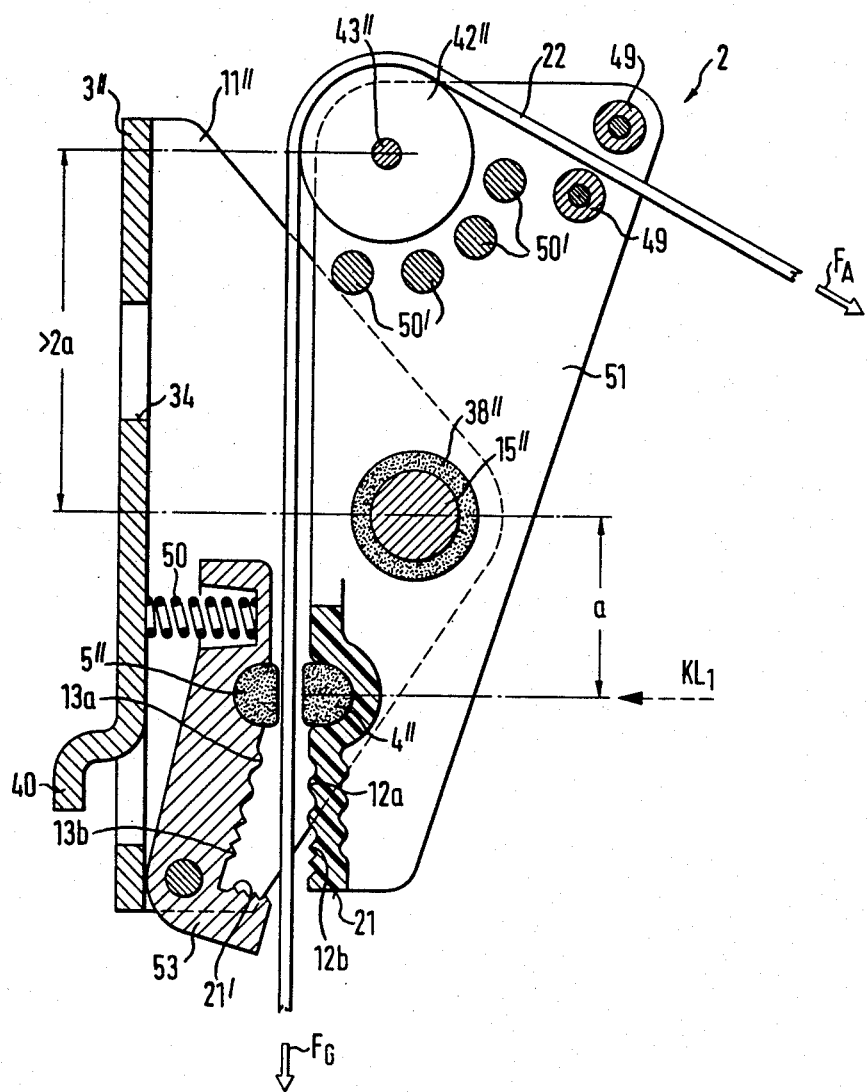
FIG. 10 shows an alternative assembly of the deflection device in the non-activated condition.
Figure 11:
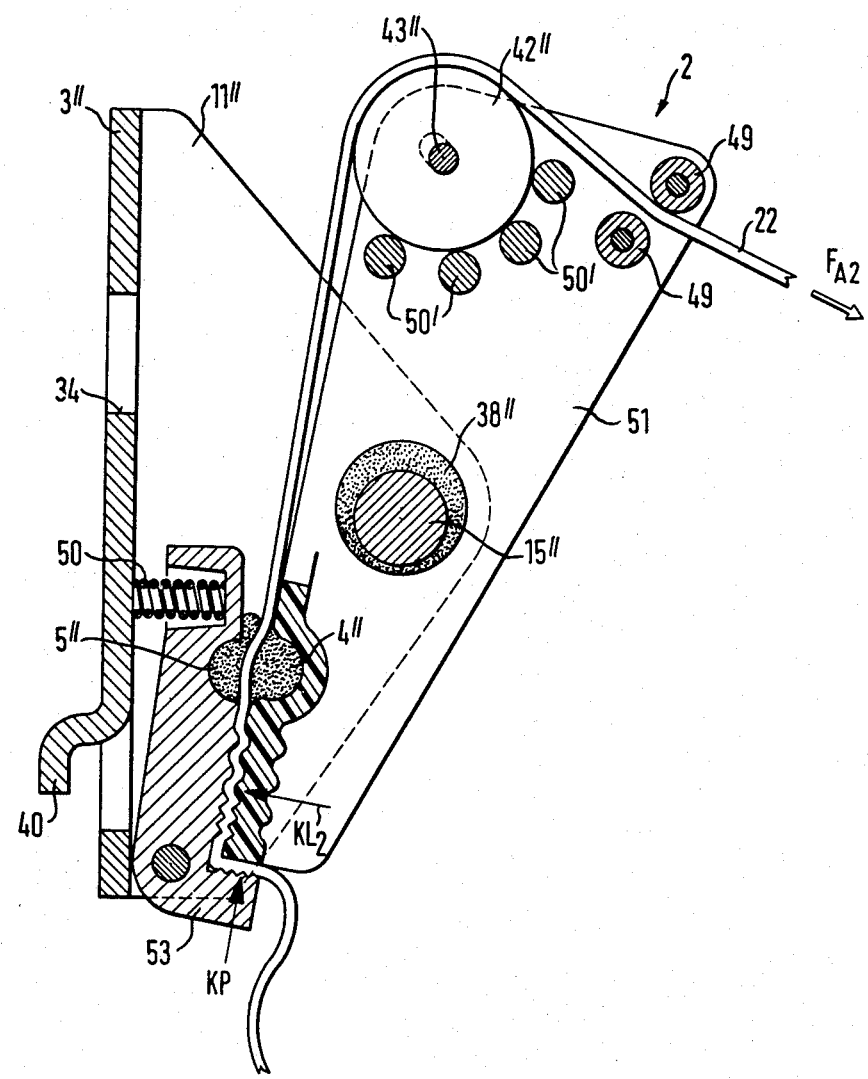
FIG. 11 shows the assembly according to FIG. 10 in the activated condition in the second locking mode.

An alternative to the construction according to FIGS. 8 and 9 is represented by the deflector clamp according to FIGS. 10 and 11. The construction of the parts is differently selected and the belt clamping takes place against a movable clamping flange 53 which is rotatably mounted in the base plate 3" against the action of a pressure spring 50. A very stiff pressure spring 50 can be employed in order to act in the clamping zone 1 (up to 500 N) as a stiff flange. Only in the clamping zone 2 (from 500 N) does movement of the clamping flange 53 occur so that first of all the rounded teeth 12a and 13a of the clamping surfaces are effective. Only in the clamping zone 3 (from 2 kN), as a result of further movement of the clamping flange 53 also activation of the sharp toothed formation 12b and 13b takes place until the lower clamping surfaces 21, 21' effect clamping in the final condition as shown in FIG. 11. As a result, downward displacement of the bearing 38" takes place so that in addition to the clamping force components $KL_2$ the component KP occurs which prevents slipping of the belt.

A deflector roller 42" has moved downwards under load and abuts against the support axle 50'. The belt 22 passes through two deflector rollers 49 so that it is guided cleanly around the deflector roller 42" and cannot drop down. These deflector rollers have the same function as the upper member in the preceding FIGS.

For the first clamping zone, the flexible clamping pads 4" and 5" are provided. In this connection, the clamping pad 4" together with the flexible clamping surface insert 21 is located on a pivoting carrier 51 which carries the deflector roller 42", belt deflector rollers 49 and the support axle 50' and abuts the flexible mounting box 38" on the rotation axle 15". By this means there exists an effective lever distance a between the clamping pad 4" and the rotation axle 15", as well as an effective lever arm between this rotation axle 15" and the axle 53" of the deflector roller 42", which distance should be larger than twice a. The rotation axle 15" is mounted moreover in two holding plates 11" which are secured on the base plate 3".

Figure 12:
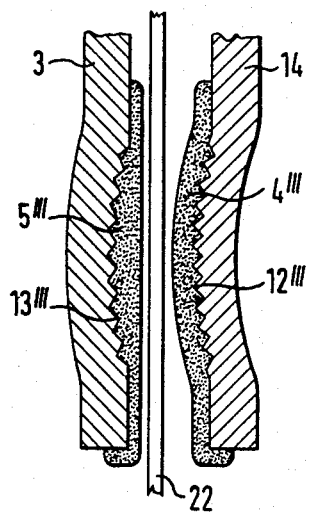
FIG. 12 shows a sectional view through the clamping surfaces.
Figure 13:
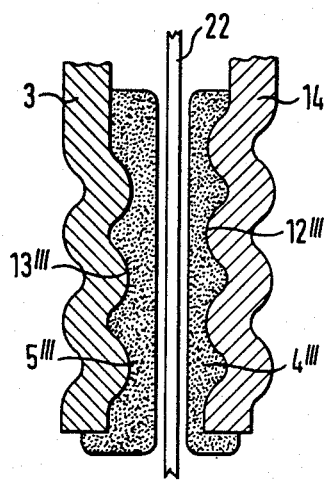
FIG. 13 shows a sectional view of an alternative assembly of the clamping surfaces.

In FIGS. 12 and 13, further possibilities of progressive belt clamping are illustrated. Here the various clamping surfaces are constructed integrally. The base bodies 3, 3' and 14 are for this purpose provided with the toothed area 12''' and 13'''. The toothed area is in one case provided with sharp teeth (FIG. 12) and in one case with rounded teeth (FIG. 13). The toothed regions are covered with a flexible adhesive layer 4''', 5''' and preferably vulcanized over with a rubber composition. In the clamping zone 1, the belt 22 is held only by the adhesive layer 4''', 5'''. The transfer into the other clamping zone upon load increase takes place continuously until a form-locking toothed engagement with the belt occurs in the clamping zone 3.

Figure 14:
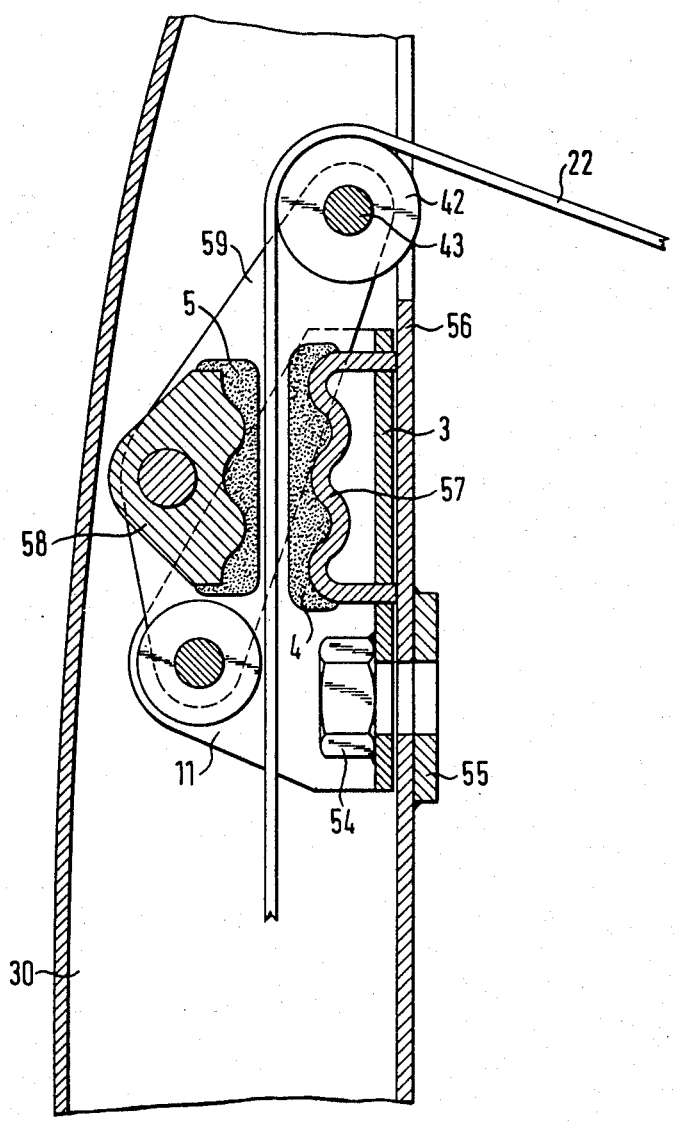
FIG. 14 shows a further alternative assembly of the deflection device.

FIG. 14 shows a deflector clamp whose construction is suitable for installation in the B column 30. The belt clamping takes place between two clamping jaws 57 and 58 in a similar manner to FIG. 13, one being movable and able to smoothly adapt. Two carriers 59 are arranged adjacent limbs 11 within a housing 3. A return spring which is present is not illustrated in this drawing. The clamping jaws have likewise a rounded toothed region with clamping surfaces 4, 5 provided with a vulcanized coating, the housing 3 being secured by means of a nut 54 and a plate 55 on the base plate 56 of the B column 30.

Figure 15:
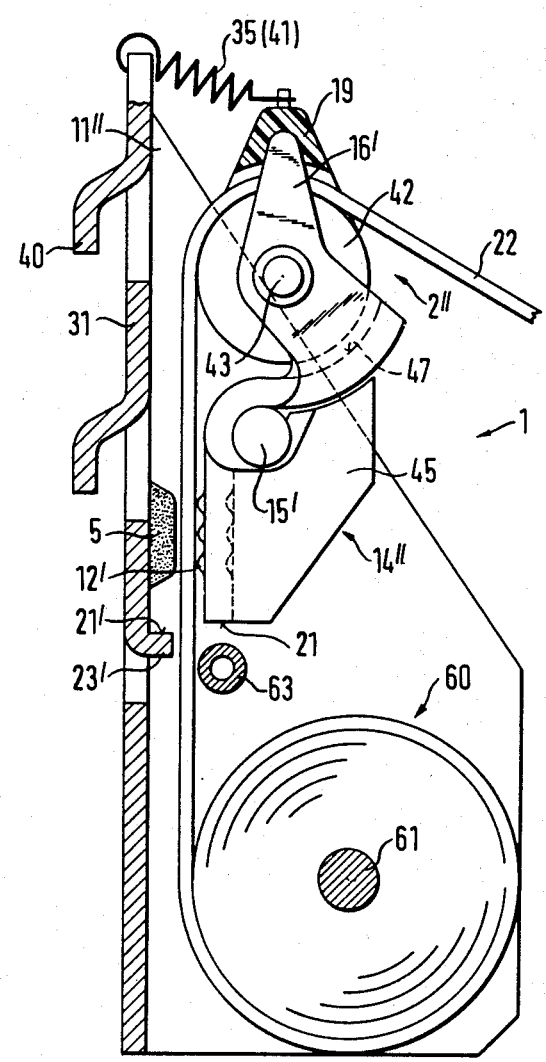
FIG. 15 shows a deflection device with integrated winder.

FIG. 15 shows an exemplary embodiment similar to FIG. 8 however with the difference that a deflection guide 63 is provided and a roller 60 is built-in to the housing of the deflector clamp and is supported on a winder shaft 61. The winder shaft of the reel can be coupled to a belt-tightening unit which is not illustrated. Between the deflector 2, 2" and the reel 60, a deflection element 63 is located.

Figure 16:
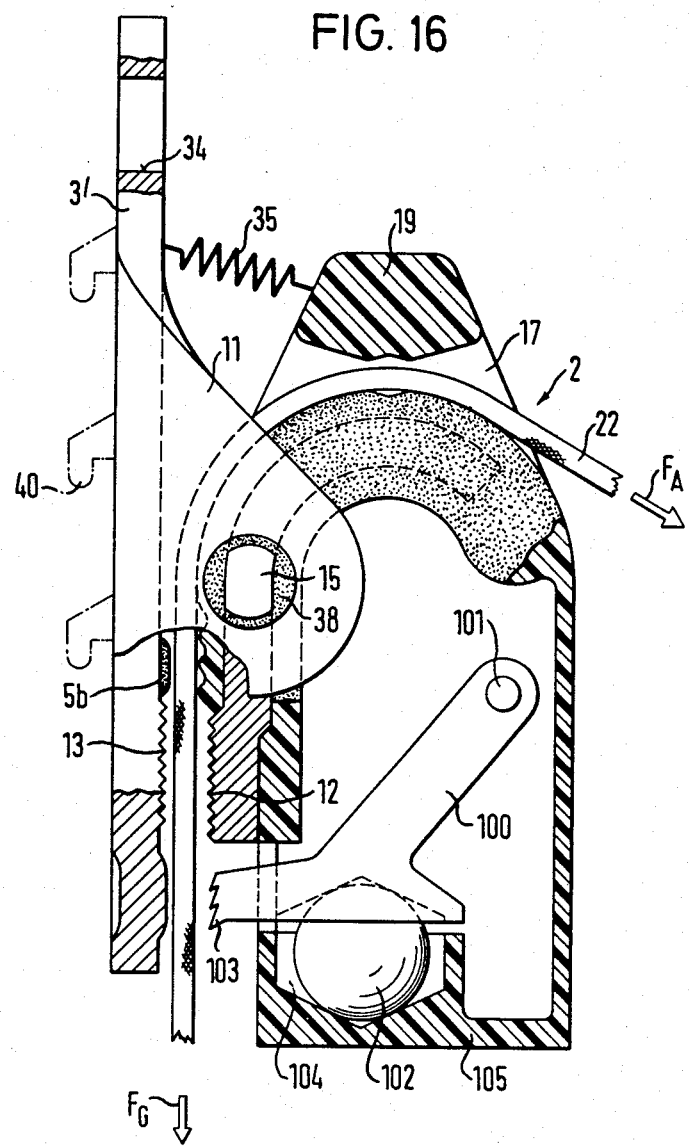
FIG. 16 shows a deflection device with integrated vehicle sensors.

FIG. 16 shows a deflector similar to that in FIG. 1a, however with the difference that the rigid clamping surface is itself provided with the toothed region 13 of the base plate 3' and that the preclamping surface 5b is arranged on the base plate above this toothed region. An important difference from FIG. 1a is however the integrated construction of a vehicle sensor 105 in the form of a ball 102 which is movably arranged in a cage form 104. This ball is in contact with an activation member constructed as a pivotable lever 100, which pivotable lever is pivotable about the axle 101. On the end of this pivotable lever directed towards the belt 22, is located a toothed engagement surface 103.

The belt-sensitive locking action can be accomplished by the spring 35. It is then not only a return spring but also a so-called G value spring (=sensor spring).

If the belt withdrawal is strongly accelerated by means of the force $F_4$, for example above 1 g, the inertia forces in the belt store (=winder without locking function) arranged beneath the deflector clamp increase. As a result, a counterforce $F_G$ occurs in the belt. As a result of the force balance, the deflector 2 tips against the force of the spring 35 in the clockwise sense and a locking action is initiated, first of all a prelocking with 5b which upon increasing load transfers into a clamping locking between 12 and 13.

The vehicle-sensitive locking initiation takes place upon exceeding a deceleration of the vehicle above 0.40 g. In this connection, the sensor ball 102 is deflected so that the pivot lever 100 acting as a locking lever is pivoted with its toothed engagement surface 103 against the belt. As a result of the thus occurring engagement angle, a slight clamping action takes place which counters belt withdrawal. If now after deflection of the pivot lever 100 belt withdrawal $F_4$ takes place, the deflector 2 is immediately pivoted against the spring 35 so that prelocking takes place with 5b.

Instead of the toothed engagement surface 103, also an engagement surface provided with a high friction layer can be employed.

Such a device on a purely mechanical basis without auxiliary energy (for example electrically with a solenoid 41 according to FIG. 7) represents an optimum in protective effect within a safety belt. It provides the absolutely shortest belt withdrawal without the film spool effect, i.e. the smallest initial displacement in the case of an accident.

Figure 17:
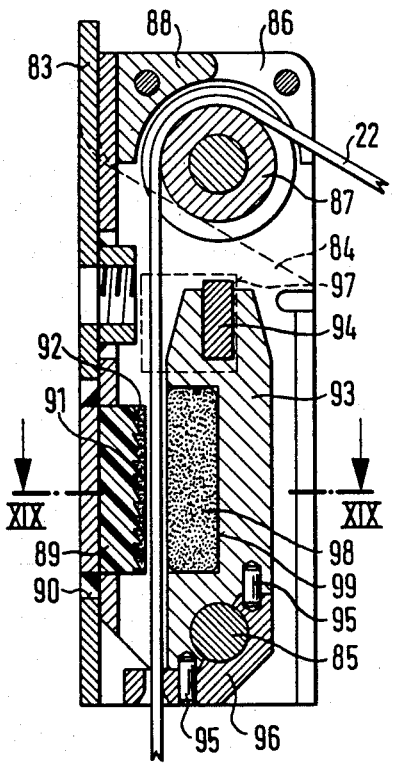
FIG. 17 shows a further alternative assembly of the deflection device in section without clamping.
Figure 18:
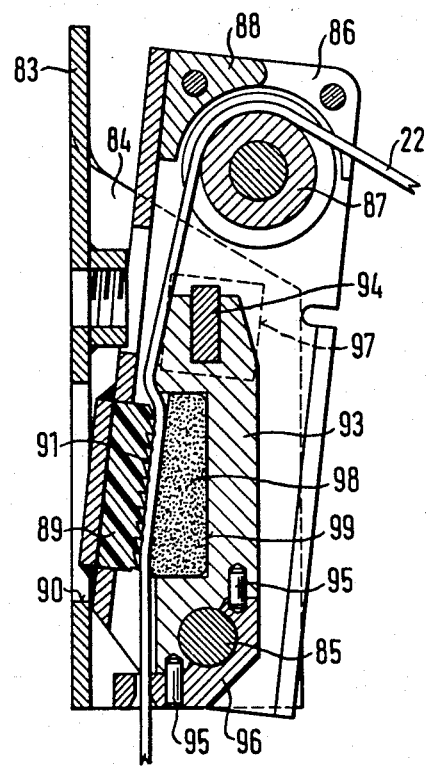
FIG. 18 shows the deflection device according to FIG. 17 in the accident-induced clamping condition.
Figure 19:
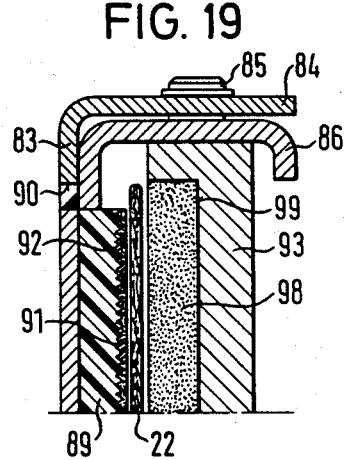
FIG. 19 shows a partial sectional view along the line XIX—XIX in FIG. 17.

In the embodiment according to FIGS. 17, 18 and 19, a base plate 83 of U-shaped construction is provided with two limbs 84. Between the limbs 84 is locked a pivot bolt 85. On this pivot bolt is mounted a pivot housing 86 on whose upper end a deflector roller 87 is rotatably mounted. Opposite this deflector roller, where the belt 22 lies, is located a belt guide 88.

The pivot housing 86 is provided in the lower region on the base plate 83 with a movable clamping jaw 89. This clamping jaw lies in the initial position illustrated in FIG. 17 on the base plate 83 and partly extends into an opening 90 located in the base plate 83. The movable clamping jaw 89 is provided with a toothed clamping surface 91. This toothed clamping surface 91 is covered by an elastically and/or plastically deformable frictional layer 92.

Opposite the movable clamping jaw 89 is located an immovable clamping jaw 93 which is likewise mounted on the pivot bolt 85 and is held on the oppositely lying side by a holding rod 94. The forces occurring in this immovable clamping jaw are taken up by the holding bar 94 and the pivot bolt 85. On the lower end of the immovable clamping jaw 93, a guide part 96 for the belt 22 is mounted by means of securing pins 95. In order to ensure movement of the pivot housing 86 in spite of the presence of the holding bar 94, in the pivot housing on both sides is provided a rectangular opening 97.

Opposite the clamping jaw 89 is located a friction pad 98 which is located in an opening 99 of the fixed clamping jaw 93.

In FIG. 17, the normal operational position without clamping is illustrated. The guide parts 88 and 96 ensure that the belt can pass freely between the clamping surfaces of the clamping jaws 89 and 93 when the belt is withdrawn across the deflector roller 87 under corresponding conditions.

In FIG. 18, the clamping condition is illustrated in which the clamping housing 86 is pivoted into its extreme right-hand position in which the frictional layer 92 is overcome and the engagement teeth 91 engage in the belt 22. In this condition, the frictional pad 98 is also deformed to such extent that the movable clamping jaw 89 presses the belt at the upper end slightly into the opening 99 of the movable clamping jaw 93, where the belt passes for a short distance across a sharp deflector which leads to increase of the clamping force.

This exemplary embodiment represents a particularly simple and expedient construction of the generally described deflector clamp.

It is still to be mentioned that the frictional layer 92 may cover the entire clamping surface of the movable clamping jaw. There is however also the possibility of providing a narrow strip across the entire height of the clamping surface.

What I claim is:

1. Deflection device for a safety belt preferably for mounting on the B and C columns of vehicles having means for direct locking of the belt by clamping and for receiving the loading in the case of an accident, characterised in that a two-stage arresting device is provided in such manner that on the occurrence of the usual locking not caused by an accident after exceeding of a predetermined deceleration a first arresting action in the form of a clamping not damaging to the belt takes place by tilting movement of a resiliently biased deflection element to bring two preclamping surfaces at least one of which is of a deformable material into mutual engagement with the belt, which in the case of an accident causing a higher deceleration transfers into a second arresting action having a more fully effective belt clamping for secure and substantially slip-free load absorption.

2. Deflection device according to claim 1 characterised in that for the first arresting action the deflection element is tiltable with a lever ratio greater than 2 and in that both of said preclamping surfaces are of deformable material, 3. Deflection device for a safety belt preferably for mounting on the B and C columns of vehicles having means for direct locking of the belt by clamping and for receiving the loading in the case of an accident, characterised in that a two-stage arresting device is provided in such manner that on the occurrence of the usual locking not caused by an accident after exceeding of a predetermined deceleration a first arresting action in the form of a clamping not damaging to the belt takes place by tilting movement of a resiliently biased deflection element with a lever ratio greater than 2 to bring two deformable preclamping-surfaces comes into mutual engagement with the belt, further tilting movement of said deflection element caused by a higher accident deceleration effecting a second arresting action with more fully effective belt clamping for secure and substantial slip-free load absorption by bringing two aggressive clamping surfaces into mutual engagement with the belt.

4. Deflection device according to claim 3 characterised in that the deflection element has two journal mountings, is spring-biased and is rotatable in two pivot arms connected to a base plate via a deliberate weak point.

5. Deflection device according to claim 1 characterised in that the deflection element includes a base body formed as a semicircular profile from which two mounting arms extend in the axial direction and two upwardly extending limit pins.

6. Deflection device according to claim 4 characterised in that the aggressive clamping surfaces are formed from a flange and a clamping part adapted for form-locking therewith.

7. Deflection device according to claim 6 characterised in that the flange is secured on the base plate and the clamping part is formed from the deflection element.

8. Deflection device according to the claim 1 characterised in that the pivot arms on the one hand have a circular mounting aperture for reception of the mounting journals and on the other hand have an opening having a pivot boss which engages in a pressed holder of the base plate.

9. Deflection device according to the claim 1 characterised in that the pivot arms are substantially horizontally arranged in their initial position.

10. Deflection device according to the claim 1 characterised in that the deflection device is inclined in the driving direction onto the shoulder of the occupants and is rigidly connected to the chassis.

11. Deflection device according to the claim 1 characterised in that between the deflection element and the base plate a solenoid is integrated which responds to electrical signals of an electronic vehicle sensor and/or brake light circuit to effect a movement for initiation of clamping.

12. Deflection device according to claim 1 charactised in that it includes a base body as a stamped bent part has two limit surfaces with holes for a roller axle and a concave support surface, two support ribs, pressed clamping surfaces and a lower clamping surface, and in that a pivot axle is fixedly arranged by two openings.

13. Deflection device according to claim 12 characterised in that the base body is provided with a low friction rotating deflector roller, in a first arresting stage clamps against a hard rubber pin with rounded metallic clamping surfaces and in a second arresting stage clamps with a lower clamping surface against a clamping surface of a flange of the base plate.

14. Deflection device according to claim 1 characterised in that the deflection device is carried on a base plate and a clamping jaw is secured in a spring-biased manner onto the base plate.

15. Deflection device according to claim 1 characterised in that the deflection element is mounted with its rotation axis in an elastic bearing.

16. Deflection device according to claim 3 characterised in that the clamping surfaces are constructed to be integrated as progressive clamping surfaces in that on an at least one aggressively toothed clamping surface a flexible adhesive layer is provided.

17. Deflection device according to claim 1 characterised in that the deflection device includes a housing and a winder for the belt is intergrated in said housing.

18. Deflection device according to claim 1 characterised in that a vehicle-sensitive sensor is integrated in the deflection device.

19. Deflection device for a safety belt preferably for mounting on the B and C columns of vehicles having means for direct locking of the belt by clamping and for receiving the loading in the case of an accident, characterised in that a two-stage arresting device is provided in such manner that on the occurrence of the usual locking not caused by an accident after exceeding of a predetermined deceleration a first arresting action in the form of a clamping not damaging to the belt takes place by tilting movement of a resiliently biased deflection element which in the case of an accident causing a higher deceleration transfers into a second arresting action having a more fully effective belt clamping for secure and substantially slip-free load absorption, the deflection device embodying a vehicle-sensitive sensor, the sensor having a movable sensor part so arranged in the deflection element mounted rotatably on the vehicle, that this sensor part acts on an activation member and thereby the activation member can be applied with its gripping surface onto the belt.

20. Deflection device according to claim 19 characterised in that the activation member is rotatably secured as a pivot lever on the deflection element and the deflection element is to be moved by the activation member with the clamping surface onto the belt when the activation member itself comes into engagement with the belt.

21. Deflection device according to claim 20 characterised in that the movable sensor part is a ball.

22. Deflection device according to claim 1 characterised in that a movable clamping jaw together with a deflector roller is mounted on a pivot pin secured to the vehicle, in that the clamping jaw is provided with a toothed clamping surface covered with a deformable mass and and there is provided another clamping jaw having a deformable clamping pad forming a clamping surface, and located in an opening in said other clamping jaw.

23. Deflection device according to claim 1 characterised in that for the first arresting action the deflection element is tiltable with a lever ratio greater than 2 and in that at least one of the deformable material surfaces is elastically deformable.

24. Deflection device according to claim 1 characterised in that for the first arresting action the deflection element is tiltable with a lever ratio greater than 2 and in that at least one of the deformable material surfaces is plastically deformable.

* * * * *